(12) United States Patent
Urano et al.

(10) Patent No.: US 9,885,402 B2
(45) Date of Patent: Feb. 6, 2018

(54) DRIVING UNIT

(71) Applicant: Mitsuba Corporation, Gunma (JP)

(72) Inventors: Yoshitaka Urano, Gunma (JP); Yasushi Yoshida, Gunma (JP); Yoshitaka Sekine, Gunma (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 0 days.

(21) Appl. No.: 15/114,000

(22) PCT Filed: Jan. 23, 2015

(86) PCT No.: PCT/JP2015/051901
§ 371 (c)(1),
(2) Date: Jul. 25, 2016

(87) PCT Pub. No.: WO2015/111719
PCT Pub. Date: Jul. 30, 2015

(65) Prior Publication Data
US 2016/0348768 A1 Dec. 1, 2016

(30) Foreign Application Priority Data

Jan. 27, 2014 (JP) .................. 2014-012491

(51) Int. Cl.
*F16H 19/06* (2006.01)
*E05F 15/643* (2015.01)
(Continued)

(52) U.S. Cl.
CPC ......... *F16H 19/06* (2013.01); *E05D 15/0621* (2013.01); *E05F 15/643* (2015.01);
(Continued)

(58) Field of Classification Search
CPC .... F16H 19/06; F16H 19/0672; F16H 57/025; F16H 57/028; F16H 57/0672; H02K 5/00;
(Continued)

(56) References Cited

U.S. PATENT DOCUMENTS 6,009,671 A 1/2000 Sasaki et al.
6,270,148 B1 * 8/2001 Noda .................... B60J 5/06
296/155
(Continued)

FOREIGN PATENT DOCUMENTS

EP 894918 A1 * 3/1999 ............ E05B 15/02
JP 62-131578 U1 8/1987
(Continued)

OTHER PUBLICATIONS

International Search Report for International Application No. PCT/JP2015/051901 dated Mar. 10, 2015.

*Primary Examiner* — Jacob S. Scott
*Assistant Examiner* — Tinh Dang
(74) *Attorney, Agent, or Firm* — McCormick, Paulding & Huber LLP

(57) ABSTRACT

A ring gear (82) of a planetary gear speed reducer (80) is fixed to a casing (31) provided with a core metal (31) fixed to a vehicle panel via a rubber damper (92). Therefore, the driving unit can be reduced in size through adoption of a speed reducer (80) formed of gears (82) made of spur gears, and the rubber dumper (92) can suppress low frequency vibrations which are transmitted from the speed reducer (80) to the vehicle panel. Therefore, the vehicle body of the vehicle having a low characteristic frequency is prevented from resonating with the incoming low frequency vibrations to generate noises which are transmitted to the vehicle interior, and which give an occupant an unpleasant feeling.

4 Claims, 13 Drawing Sheets

(51) Int. Cl.

| | |
|---|---|
| *E05F 15/646* | (2015.01) |
| *H02K 5/24* | (2006.01) |
| *H02K 7/116* | (2006.01) |
| *F16H 57/025* | (2012.01) |
| *F16H 57/028* | (2012.01) |
| *E05D 15/06* | (2006.01) |
| *F16H 1/28* | (2006.01) |
| *H02K 5/00* | (2006.01) |
| *B60J 5/06* | (2006.01) |
| *F16H 57/02* | (2012.01) |

(52) U.S. Cl.
CPC ............. *E05F 15/646* (2015.01); *F16H 1/28* (2013.01); *F16H 19/0672* (2013.01); *F16H 57/025* (2013.01); *F16H 57/028* (2013.01); *H02K 5/00* (2013.01); *H02K 5/24* (2013.01); *H02K 7/116* (2013.01); *B60J 5/06* (2013.01); *E05Y 2201/10* (2013.01); *E05Y 2201/434* (2013.01); *E05Y 2201/438* (2013.01); *E05Y 2201/654* (2013.01); *E05Y 2400/36* (2013.01); *E05Y 2600/50* (2013.01); *E05Y 2800/422* (2013.01); *E05Y 2900/531* (2013.01); *F16H 2019/0686* (2013.01); *F16H 2057/02034* (2013.01)

(58) Field of Classification Search
CPC ......... H02K 5/24; H02K 5/116; E05F 15/643; E05F 15/646; E05F 15/0621
See application file for complete search history.

(56) References Cited

U.S. PATENT DOCUMENTS

| | | | | |
|---|---|---|---|---|
| 6,270,149 | B1* | 8/2001 | Fukumoto | E05F 15/638 296/155 |
| 6,397,523 | B1* | 6/2002 | Fukumoto | E05F 15/638 192/55.6 |
| 6,408,573 | B1* | 6/2002 | Fukumoto | H02K 7/1163 49/360 |
| 6,866,250 | B2* | 3/2005 | Kita | E05F 15/646 254/225 |
| 7,104,533 | B2* | 9/2006 | Kato | F16F 1/3842 267/140.12 |
| 8,727,926 | B2* | 5/2014 | Ishida | F16H 1/28 475/157 |
| 9,421,887 | B2* | 8/2016 | Jung | B60N 2/02 |
| 9,490,679 | B2* | 11/2016 | Yamamoto | B60K 7/00 |
| 2007/0111845 | A1* | 5/2007 | Hayakawa | E05B 81/20 475/317 |
| 2007/0215089 | A1* | 9/2007 | Grand | F02N 15/067 123/179.25 |
| 2016/0160560 | A1* | 6/2016 | Mazzoni | E06B 9/72 475/331 |

FOREIGN PATENT DOCUMENTS

| | | |
|---|---|---|
| JP | 63-005182 U1 | 1/1988 |
| JP | 05-002758 Y | 1/1993 |
| JP | H10-131612 A | 5/1998 |
| JP | 2012-097486 A | 5/2012 |

* cited by examiner

DRIVING UNIT

CROSS REFERENCE TO RELATED APPLICATION

Applicant hereby claims foreign priority benefits under U.S.C. § 119 from International Patent Application Serial No. PCT/JP2015/051901 filed on Jan. 23, 2015 and Japanese Patent Application No. 2014-012491 filed on Jan. 27, 2014, the contents of all of which are incorporated by reference herein.

TECHNICAL FIELD

The present invention relates to a driving unit for driving an opening and closing unit incorporated in a vehicle.

BACKGROUND ART

Conventionally, a vehicle such as station wagon and minivan is formed with a relatively-large opening which allows an occupant to easily get on and out of the vehicle and allows a baggage to be put in and taken out of the vehicle. Such an opening is opened and closed with a sliding door (opening and closing unit) provided with a roller assembly. Since the sliding door is heavy in weight, the vehicle equipped with the sliding door is provided with a sliding door opening and closing mechanism capable of automatically opening and closing the sliding door.

The sliding door opening and closing mechanism is provided with a driving unit which pulls an opening cable and a closing cable so as to move the sliding door in an opening direction and a closing direction. The driving unit has a drum around which the opening cable and the closing cable are wound in respective directions reverse to each other. This drum is rotated in the normal direction or reverse direction so as to pull the opening cable or closing cable, and as a result, it causes the sliding door to move in the opening direction or in closing direction.

Since the driving unit is mounted and disposed in a relatively narrow space in the vehicle, and adapted to drive the heavy sliding door, the driving unit must be small in size and large in output. In order to meet this requirement, a speed reduction mechanism is provided between a driving source (electric motor) of the driving unit and the drum. Such a driving unit provided with a speed reduction mechanism is publicly known as a technique described in for example Japanese Patent Application Laid-Open Publication No. H10-131612 (FIG. 2).

A slide actuator (driving unit) described in Japanese Patent Application Laid-Open Publication No. H10-131612 (FIG. 2) is provided with: a motor (electric motor) serving as a driving source; and a drum having a wire (cable) wound around it. A speed reduction mechanism is provided between the motor and the drum, and with a plurality of gears (spur gears) different in diameter from each other and engaged with each other. Since the speed reduction mechanism is a so-called "spur speed reducer" having a reduction gear ratio which is smaller than that of a worm speed reducer, a low-speed and high-torque motor must be adopted as a motor for this speed reduction mechanism. In many cases, a high-speed motor having a rated rotation number no less than 3000 rpm is adopted as a motor for driving the worm speed reducer.

However, according to the slide actuator described in Japanese Patent Application Laid-Open Publication No. H10-131612 (FIG. 2), since its speed reduction mechanism can be constructed by combination of simple spur gears, it is possible to offer a slide actuator reduced in size (thickness), and reduced in sound noise through adoption of a low-speed motor.

SUMMARY

As described above, since the driving unit described in Japanese Patent Application Laid-Open Publication No. H10-131612 (FIG. 2) has an advantageous structure which can be reduced in size and sound noise, this driving unit becomes more and more mainstream in this technical field. However, this driving unit encounters a problem that since it has: a speed reducer composed of a combination of spur gears; and a low-speed motor, low frequency vibrations are generated by the driving unit, and transmitted via a fixed member provided to the driving unit to a body panel provided to the vehicle as a fitted portion, and at this time, the body panel having a low characteristic frequency resonates with the incoming low frequency vibrations to generate noises which are transmitted to the vehicle interior, and which give an occupant an unpleasant feeling.

It is therefore an object of the present invention to provide a driving unit having a speed reducer composed of a combination of spur gears, and capable of suppressing noises resulting from low frequency vibrations.

According to one aspect of the present invention, there is provided a driving unit which opens and closes an opening and closing unit incorporated in a vehicle, comprising: a casing in which a rotating shaft is rotatably supported and housed; a planetary gear speed reducer having a ring gear fixed to the casing, a fixed member attached to the casing and fixed to the vehicle, and a buffering member disposed between the casing and the fixed member, wherein the fixing member has a retainer claw for preventing from dropping off the casing; the casing has a hooking recess in which the retainer claw is received.

According to another aspect of the present invention, the casing has a first casing in which an electric motor for rotating the rotating shaft is housed, and a second casing to which the fixed member is attached, and the ring gear is fixed to the first casing, and the second casing has a contact portion which is in contact with the ring gear.

According to still another aspect of the present invention, the casing has a first casing in which an electric motor for rotating the rotating shaft is housed, and a second casing to which the fixed member is attached, and the ring gear is fixed to the second casing. According to still another aspect of the present invention, the buffering member has a slotted hole in which the retainer claw is inserted.

According to the present invention, a ring gear of a planetary gear speed reducer is fixed to a casing provided with a fixed member fixed to a vehicle via a buffering member. Therefore, the driving unit can be reduced in size through adoption of a planetary gear speed reducer composed of a combination of spur gears, and the buffering member can suppress low frequency vibrations which are transmitted from the planetary gear speed reducer to the vehicle. Therefore, the vehicle body having a low characteristic frequency is prevented from resonating with the incoming low frequency vibrations to generate noises which are transmitted to the vehicle interior, and which give an occupant an unpleasant feeling.

DETAILED DESCRIPTION

Hereinafter, the first embodiment of the present invention will be described in detail with reference to the drawings.

Figure 1:
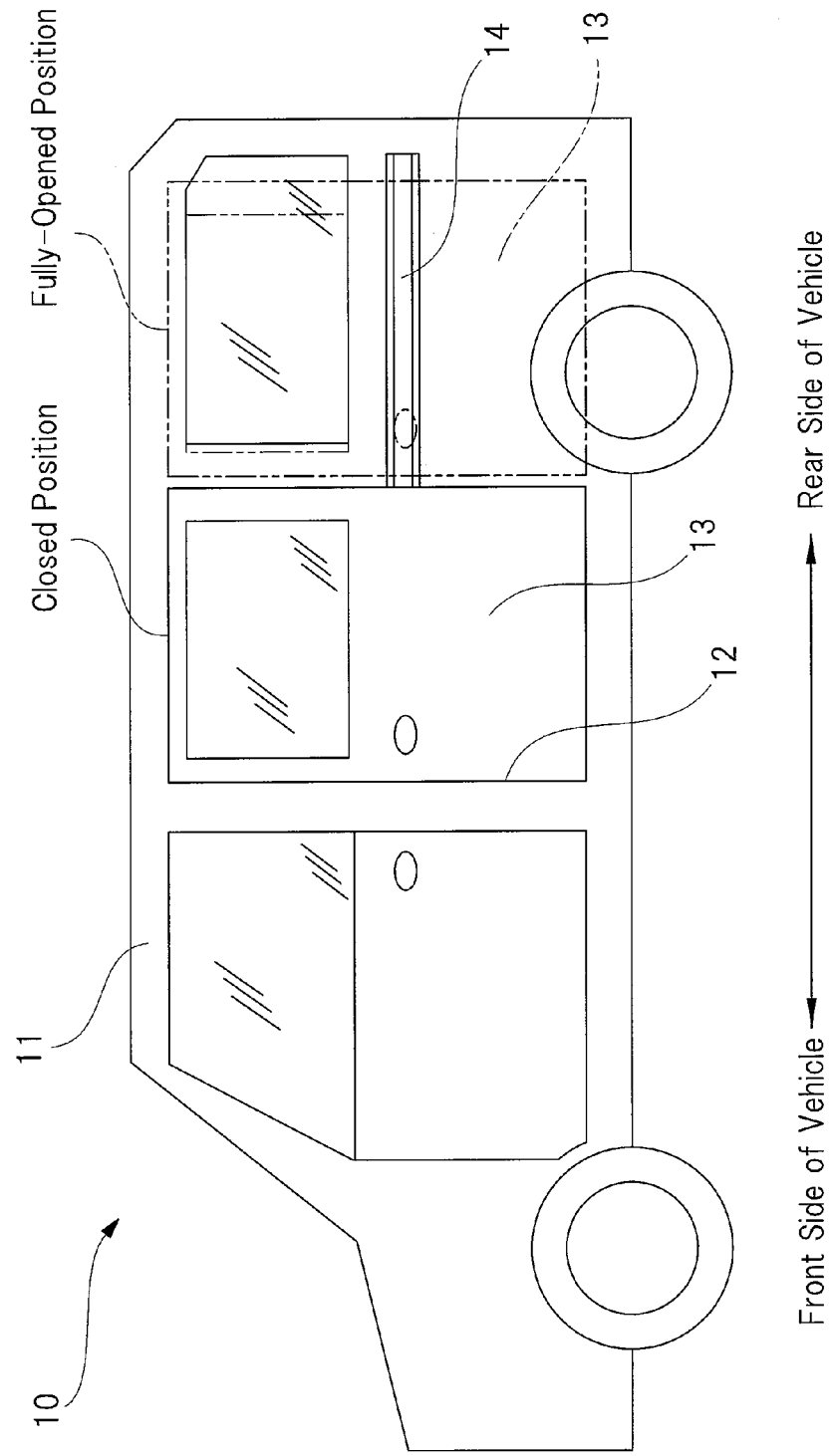
FIG. 1 is a side view showing a vehicle equipped with a driving unit according to a first embodiment.
Figure 2:
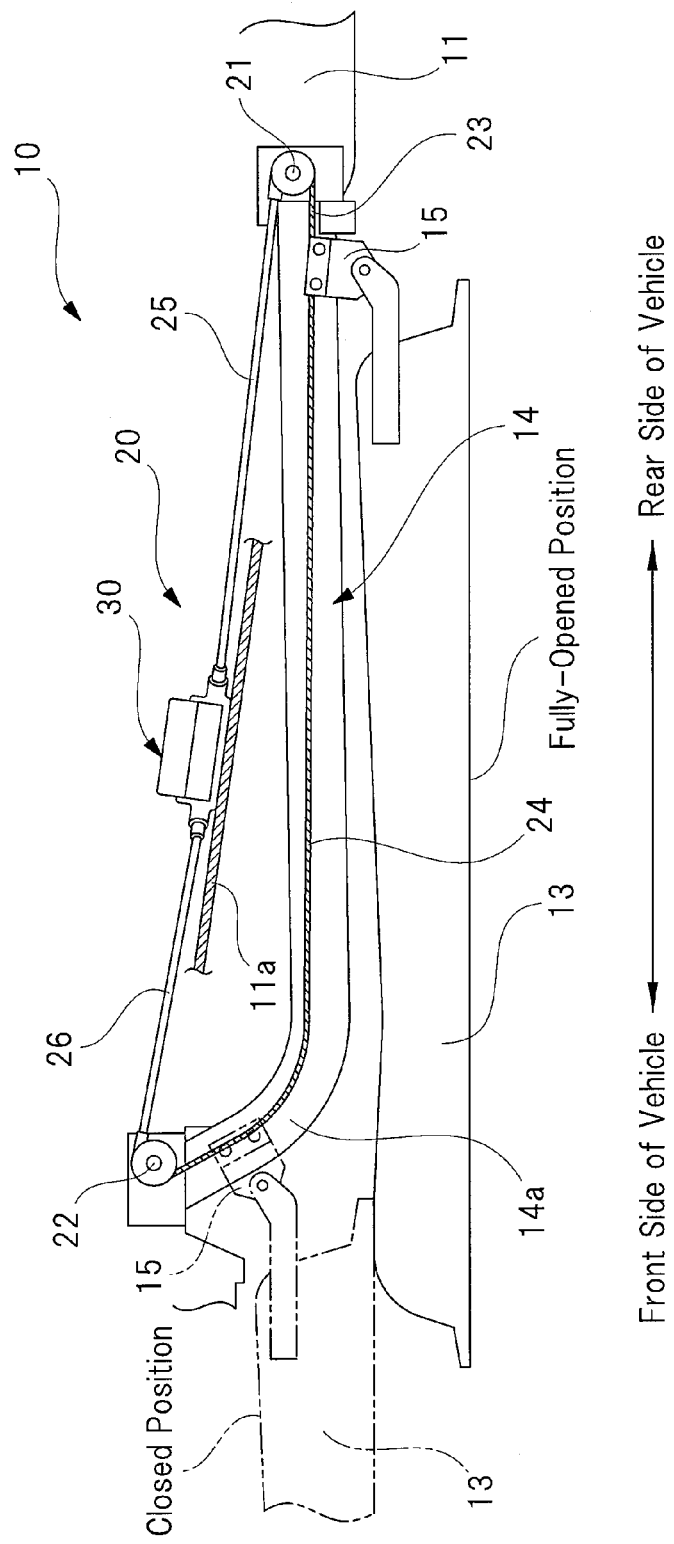
FIG. 2 is a plan view showing a mounting structure of a sliding door.
Figure 3:
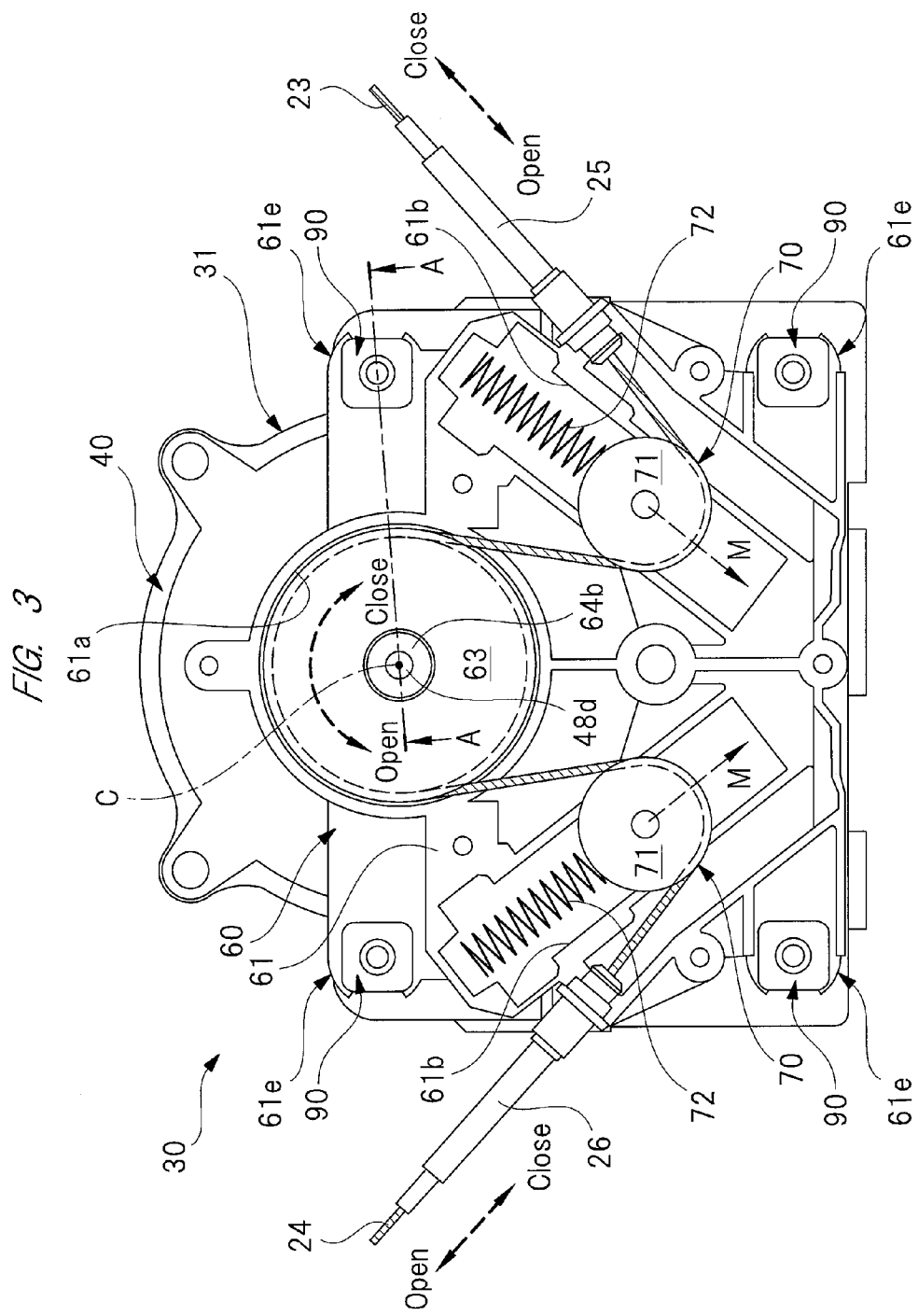
FIG. 3 is a plan view showing a detailed structure of the driving unit.
Figure 4:
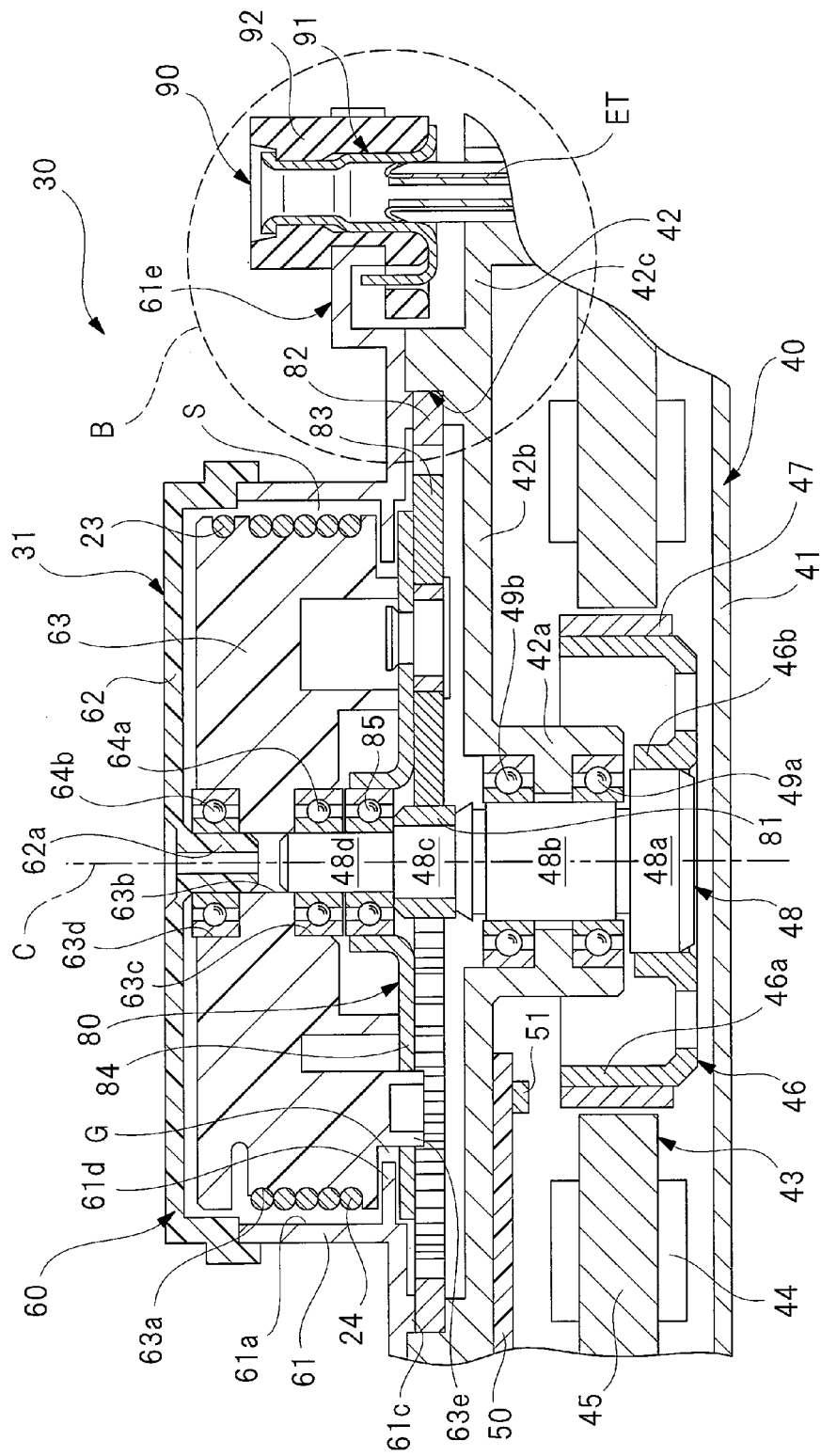
FIG. 4 is a partial sectional view taken along an A-A line in the plan view of FIG. 3.
Figure 5:
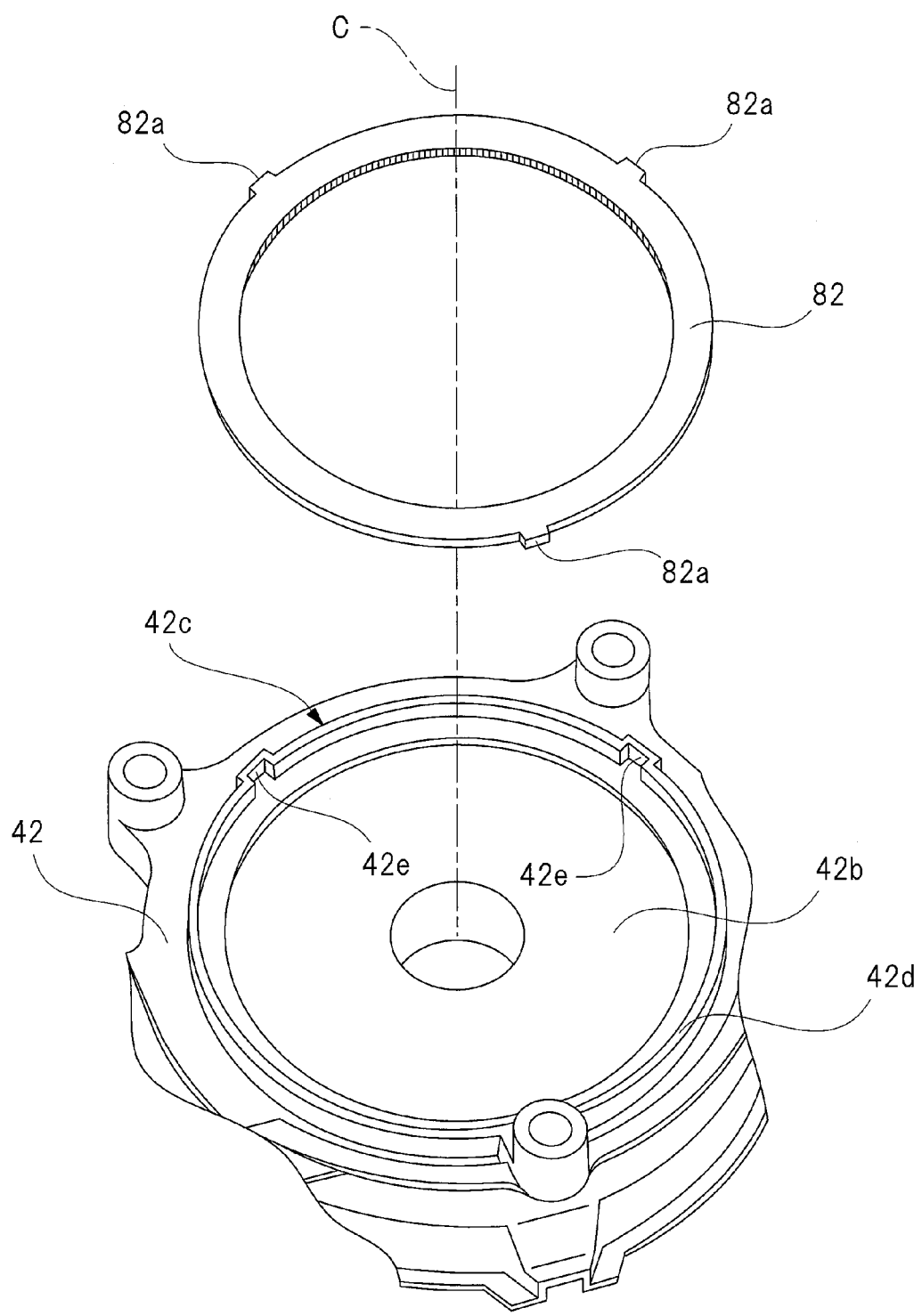
FIG. 5 is an exploded perspective view for explaining a fixing structure of a ring gear which is fixed to a motor case cover.
Figure 6:
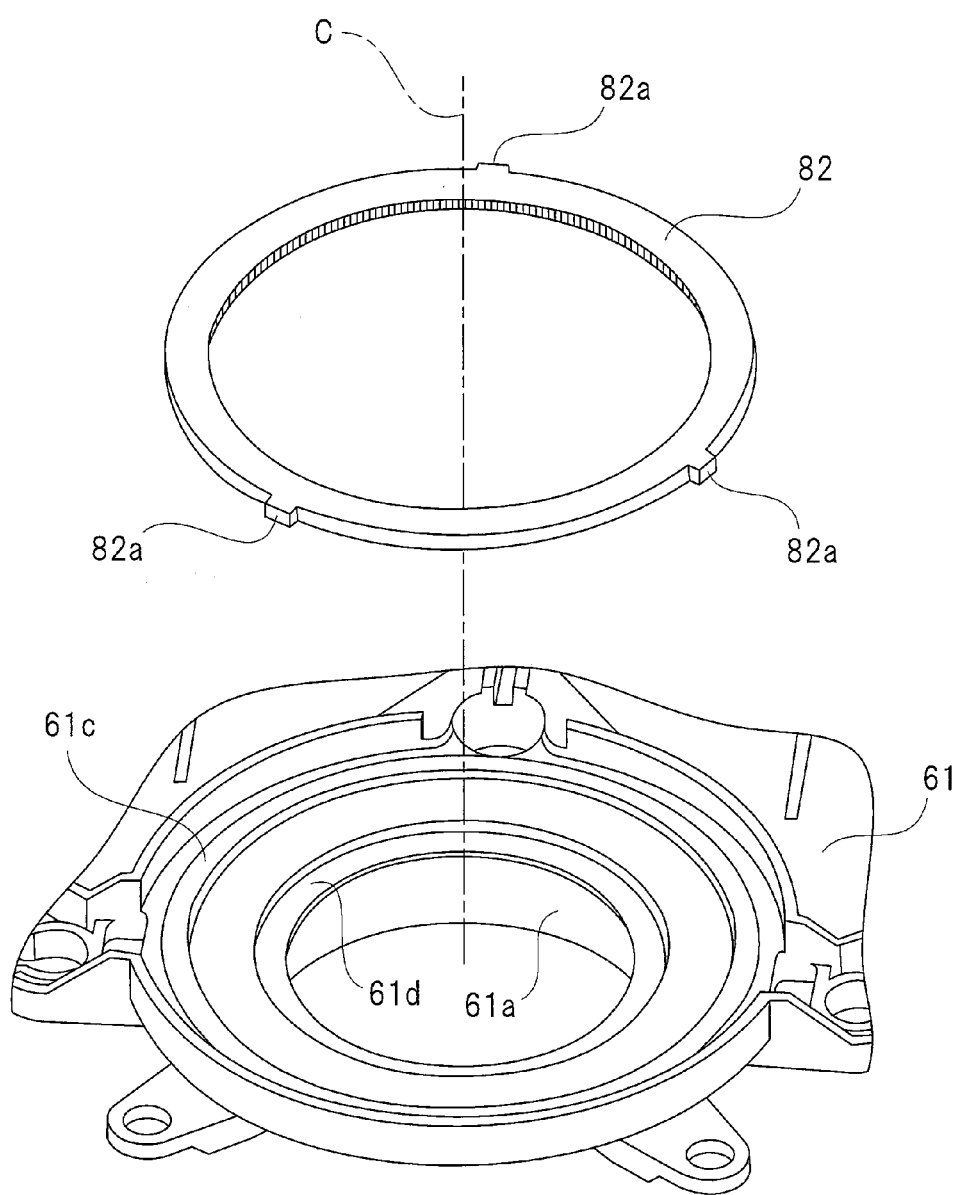
FIG. 6 is an exploded perspective view for explaining a support structure of a drum housing case which supports the ring gear.
Figure 7:
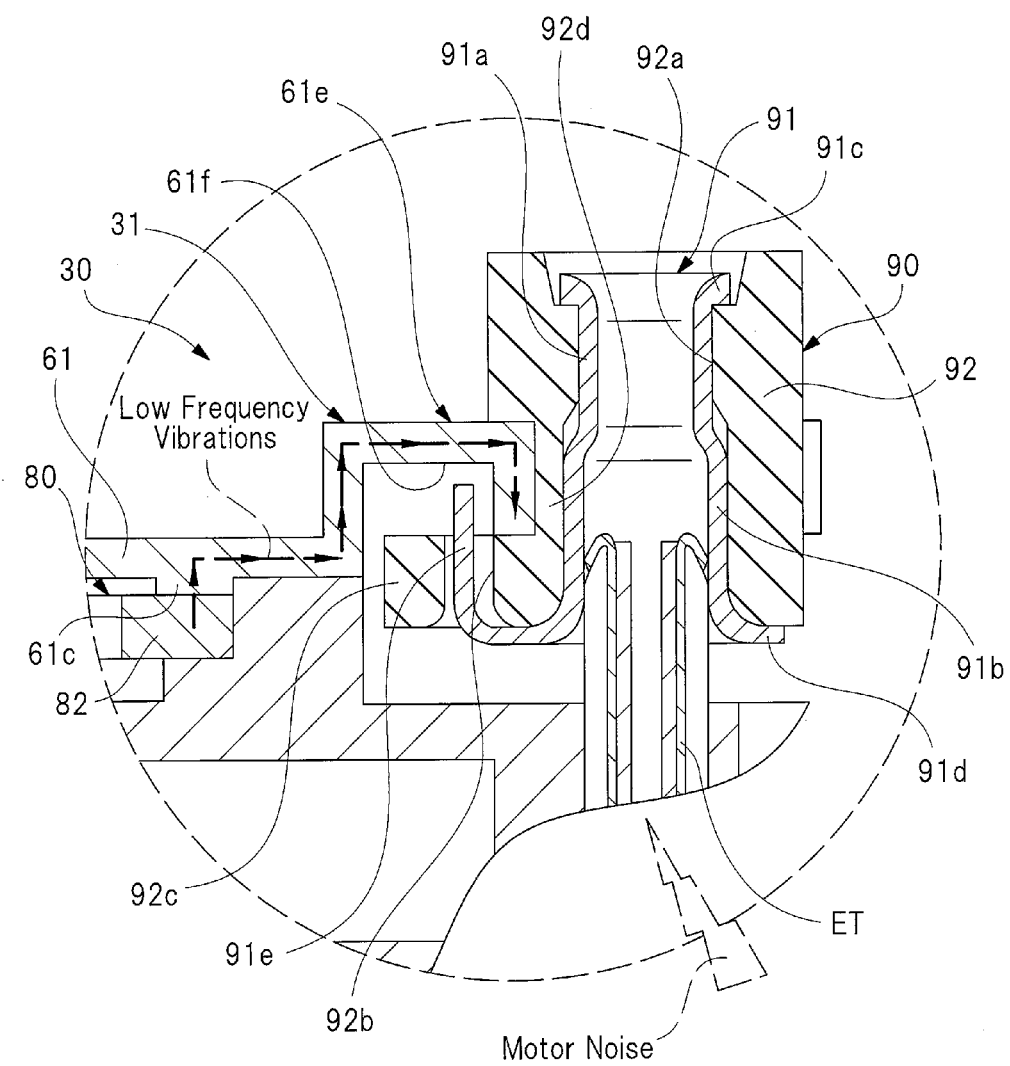
FIG. 7 is an enlarged sectional view showing a part enclosed in a broken line circle "B" in FIG. 4.
Figure 8A:
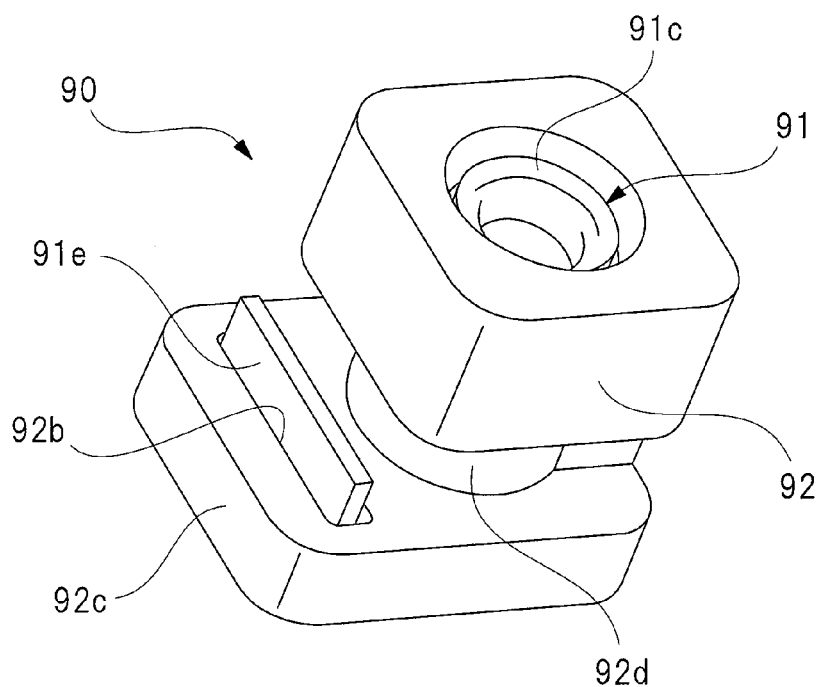
FIGS. 8A and 8B are perspective views each explaining a detailed structure of a fitting bush.
Figure 8B:
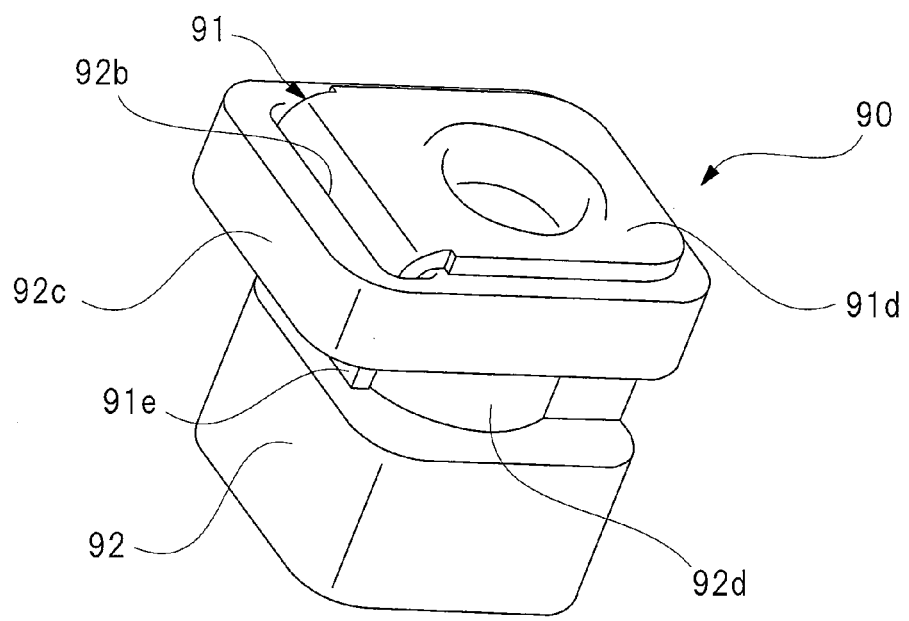
Figure 9:
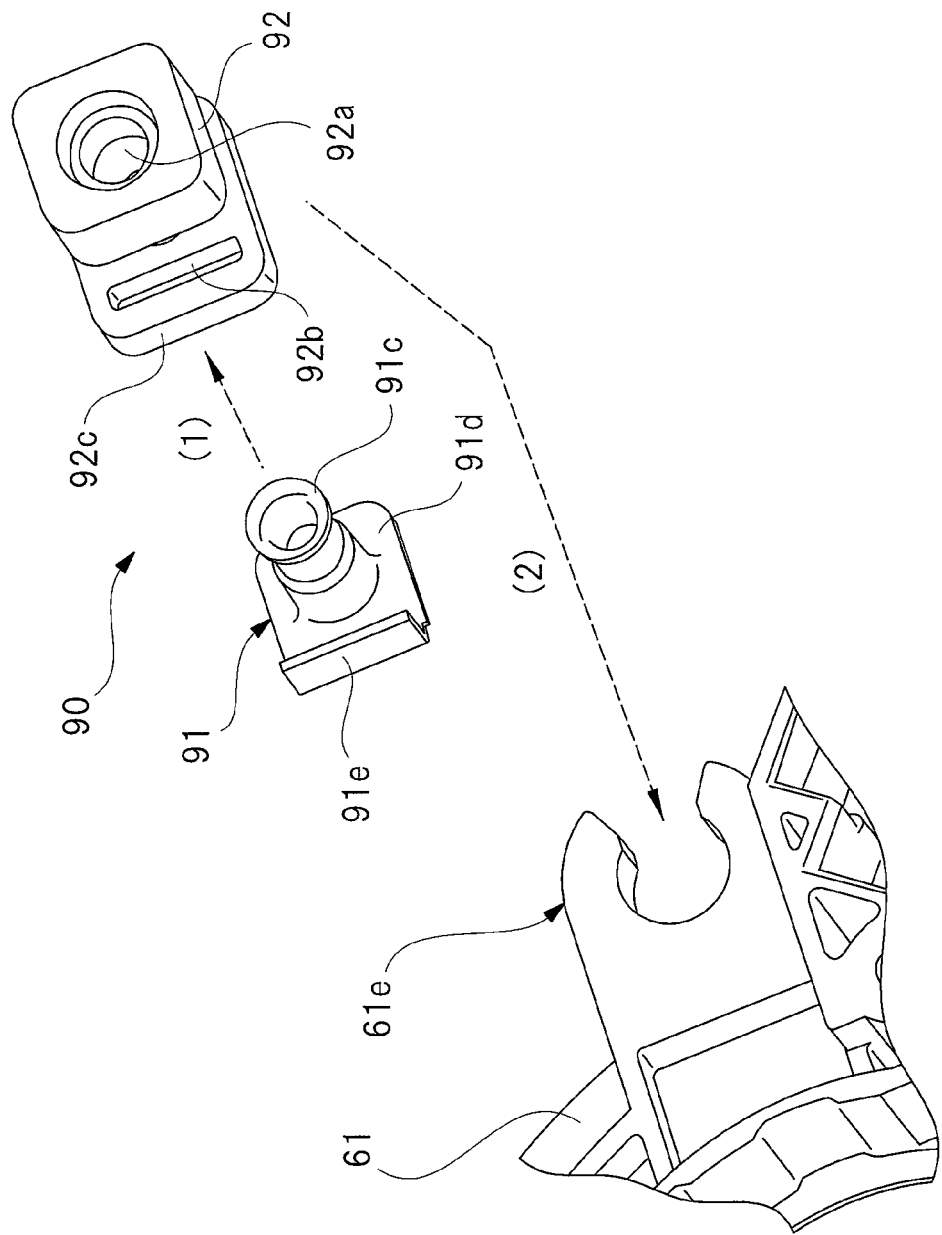
FIG. 9 is an explanatory view explaining a procedure of fitting the fitting bush to the drum housing case.

FIG. 1 is a side view showing a vehicle equipped with a driving unit according to a first embodiment, FIG. 2 is a plan view showing a mounting structure of a sliding door, FIG. 3 is a plan view showing a detailed structure of the driving unit, FIG. 4 is a partial sectional view taken along an A-A line in the plan view of FIG. 3, FIG. 5 is an exploded perspective view for explaining a fixing structure of a ring gear which is fixed to a motor case cover, FIG. 6 is an exploded perspective view for explaining a support structure of a drum housing case which supports the ring gear, FIG. 7 is an enlarged sectional view showing a part enclosed in a broken line circle "B" in FIG. 4, FIGS. 8A and 8B are perspective views each explaining a detailed structure of a fitting bush, and FIG. 9 is an explanatory view explaining a procedure of fitting the fitting bush to the drum housing case.

A vehicle 10 shown in FIG. 1 may be for example an eight-seater station wagon. A vehicle body 11 of the vehicle 10 has a side part formed with a relatively-large opening 12 which is opened and closed with a sliding door (opening and closing unit) 13 incorporated in the vehicle 10, and the sliding door 13 is guided by a guide rail 14 fixed to the side part of the vehicle body 11 so as to slide in the longitudinal direction of the vehicle 10 between a fully-closed position and a fully-opened position. By sliding the sliding door 13 toward the fully-opened position to open the opening 12, an occupant can easily get in and out of the vehicle or a baggage can be easily put in and removed from the vehicle.

As shown in FIG. 2, a roller assembly 15 is provided to the sliding door 13, and located closer to the rear part of the vehicle, and in the central area of the sliding door 13 in a vertical direction. The roller assembly 15 is guided by the guide rail 14, thereby causing the sliding door 13 to move in the longitudinal direction of the vehicle 10 along the side part of the vehicle body 11. A curved portion 14a curved toward the vehicle interior (curved upward in FIG. 2) is provided to a front side part of the guide rail 14, which is disposed on the front side of the vehicle. When the roller assembly 15 is guided by the curved portion 14a, the sliding door 13 is guided in toward the interior of the vehicle body 11 so that the sliding door 13 is substantially flush with the side part of the vehicle body 11, as indicated by a two-dot chain line in FIG. 2, and the sliding door 13 is then put in the fully-closed position.

Here, in addition to the roller assembly 15 located at the center of the sliding door 13 in its vertical direction, the sliding door 13 is provided with roller assemblies (not shown) provided to the sliding door 13 and closer to the front side of the vehicle, and both the upper and lower parts of the sliding door 13 in its vertical direction, respectively. In addition, to correspond to the roller assemblies located at the upper and lower parts of the sliding door 13, guide rails (not shown) are also disposed on the upper and lower parts of the opening 12 of the vehicle body 11, respectively. In this manner, the sliding door 13 is supported by the above three parts with respect to the vehicle body 11. Therefore, the sliding door 13 can be opened and closed in a stable manner with respect to the vehicle body 11.

A sliding door opening and closing mechanism 20 for opening and closing the sliding door 13 is provided to the side part of the vehicle body 11 of the vehicle 10. The sliding door opening and closing mechanism 20 includes a driving unit 30 which is adjacent to the approximate center of the guide rail 14 in its longitudinal direction and fixed to a body panel 11a disposed inside the vehicle body 11. The body panel 11a constitutes the frame of the vehicle body 11 and is constructed by press working a steel plate into a given shape.

The sliding door opening and closing mechanism 20 includes: a reversing pulley 21 disposed on the rear side of guide rail 14 and closer to the rear part of the vehicle; a reversing pulley 22 disposed on the front side of guide rail 14 and closer to the front part of the vehicle, an opening cable 23 for pulling the sliding door 13 toward its fully-opened position, and a closing cable 24 for pulling the sliding door 13 toward its fully-closed position. One ends of the cables 23 and 24 extend respectively to the driving unit 30, while the other ends of the cables 23 and 24 extend from the rear side of the vehicle and the front side of the vehicle to the roller assembly 15 (sliding door 13) via the reversing pulleys 21 and 22, and connected to the roller assembly 15, respectively.

By rotating the driving unit 30 in a normal direction (see the counterclockwise direction shown in FIG. 3) to pull the opening cable 23, the sliding door 13 is driven in the opening direction. On the other hand, by rotating the driving unit 30 in a reverse direction (see the clockwise direction shown in FIG. 3) to pull the closing cable 24, the sliding door 13 is driven in the closing direction.

In addition, the cables 23 and 24 have portions which are located outside the vehicle body 11, and which are concealed in an inner guide slot (not shown) of the guide rail 14. Therefore, the cables 23 and 24 are prevented from being exposed to the outside. As a result, the vehicle 10 can be improved in appearance, and the cables 23 and 24 can be protected from rainwater, dust, and the like.

Furthermore, an outer casing 25 is provided between the reversing pulley 21 and the driving unit 30, while an outer casing 26 is provided between the reversing pulley 22 and the driving unit 30, the outer casings 25 and 26 covering the cables 23 and 24 and slidably retaining the cables 23 and 24.

The outer casings 25 and 26 are flexible and each interior is coated with grease having a given viscosity (not shown). Therefore, the outer casings 25 and 26 protect the cables 23 and 24 and ensure their smooth sliding against the outer casings 25 and 26.

As shown in FIGS. 3 and 4, the driving unit 30 includes a casing 31 which is composed of a motor case 40 and a drum case 60. The motor case 40 has a bottomed motor housing case 42 and a motor case cover 41 having an almost flat structure and closing an opening of the motor housing case 42 (lower side in FIG. 4).

The drum case 60 has a drum housing case 61 and a drum case cover 62. The drum housing case 61 has: a drum housing 61a in which a drum 63 is housed; and a pair of tensioner housings 61b in which a pair of tensioner mechanisms 70 is respectively housed, the drum case cover 62 having an almost flat structure and closing both the drum housing 61a of the drum housing case 61 and the tensioner housings 61b.

As shown in FIG. 4, the motor housing case 42, the motor case cover 41, the drum housing case 61, and the drum case cover 62 are hermetically connected to each other via a sealing member (not shown). Therefore, this structure prevents rainwater, dust, etc., from entering the driving unit 30. In order to clearly explain the inner structure of the casing 31, the drum case cover 62 is not shown in FIG. 3.

In addition, the motor housing case 42, the motor case cover 41, the drum housing case 61, and the drum case cover 62 collectively constitute a casing in the present invention. Furthermore, the motor housing case 42 and the motor case cover 41 collectively constitute a first casing in the present invention, while the drum housing case 61 and the drum case cover 62 collectively constitute a second casing in the present invention.

As shown in FIG. 4, a low-speed, high-torque electric motor (driving source) 43 is housed in the motor case 40, the rated rotation number of the electric motor 43 is determined to be a low rotating speed equal to or less than 2000 rpm. The electric motor 43 is composed of a three-phase brushless motor having U-phase, V-phase, and W-phase coils 44, and having an almost disc-shaped stator core (stator) 45 fixed to the motor housing case 42. The stator core 45 is wound with the coils 44 corresponding to three phases which are turned a given number of times by a given method. A rotor 46 is rotatably disposed radially inside the stator core 45, and via a given small (air) gap between the stator core 45 and the rotor 46. In this manner, the driving unit 30 has an inner rotor type three-phase brushless motor serving as a driving source.

The rotor 46 is constructed by press working a steel plate, etc., into an almost annular shape, and has an almost U-shaped section. The rotor 46 has: an outer peripheral wall 46a formed on its radial exterior in such a way as to extend in its axial direction; and an inner peripheral wall 46b formed on its radial interior in such a way as to extend in its axial direction. The outer peripheral wall 46a is formed to be longer than the inner peripheral wall 46b.

A cylindrical permanent magnet 47 is disposed and fixed to the radial exterior of the outer peripheral wall 46a, and has a plurality of magnetic poles arranged along the circumferential direction of the rotor 46. This permanent magnet 47 faces the radial interior of the stator core 45. Therefore, by supplying a driving current in sequence to the coils 44 of three phase, the stator core 45 generates an electromagnetic force (attractive force) to rotate the rotor 46 in a given rotation direction at a given driving torque.

The base end of a rotor shaft 48, i.e., rotating shaft, is press fitted, i.e., fixed to the radial interior of the inner peripheral wall 46b. The rotor shaft 48 made by machining a solid round steel bar into an almost columnar shape with steps is rotatably disposed in the casing 31. The rotor shaft 48 has a first columnar portion 48a, a second columnar portion 48b, a third columnar portion 48c, and a fourth columnar portion 48d, which are reduced in diameter step by step in order of the first columnar portion 48a, second columnar portion 48b, third columnar portion 48c, and fourth columnar portion 48d. The first columnar portion 48a having the maximum diameter is fixed to the rotor 46.

The fourth columnar portion 48d having the minimum diameter in the rotor shaft 48, that is, the front end side of the rotor shaft 48 is provided inside the drum case 60. The fourth columnar portion 48d of the rotor shaft 48 is rotatably disposed in the approximate center of the interior of the drum housing 61a, and rotatably supports one side of the drum 63 in its axial direction (lower side of the drum 63 in FIG. 4).

The second columnar portion 48b of the rotor shaft 48 is rotatably supported by first and second ball bearings 49a and 49b. The ball bearings 49a and 49b are attached to the radial interior of an attachment cylindrical portion 42a formed in the approximate center of the motor housing case 42. The ball bearings 49a and 49b are axially aligned with each other. Therefore, the rotor shaft 48 is rotated around an axis "C" in conjunction with the rotation of the rotor 46. In other words, the electric motor 43 is axially aligned with the rotor shaft 48, and adapted to rotate it.

Here, as shown in the figures, the first and second ball bearings 49a and 49b are composed of ball bearings each having an inner race, an outer race, and balls, but they may be replaced with, for example, so-called metal bearings (slide bearings) each constructed by coating the interior of a cylindrical steel pipe with a fluororesin layer.

In addition to the electric motor 43, a sensor board 50 is also housed in the motor case 40, and the sensor board 50 is fixed to the disc-shaped body 42b of the motor housing case 42. The sensor board 50 carries a rotation sensor 51 for detecting the rotation state of the rotor 46, i.e., the rotation number and rotation position of the rotor 46. The rotation sensor 51 faces the permanent magnet 47 along the axial direction of the rotor shaft 48. In this manner, the rotation sensor 51 detects the alternation of the magnetic poles of the permanent magnet 47, that is, detects the rotation state of the rotor 46 with respect to the stator core 45.

In addition, the rotation sensor 51 is electrically connected to an in-vehicle controller (not shown), so that a detection signal is transmitted to the in-vehicle controller from the rotation sensor 51. On the basis of the detection signal from the rotation sensor 51, the in-vehicle controller recognizes the high rotating speed (greater rotation number) of the rotor 46 when finding that the magnetic pole alternation per unit time is fast, and identifies the rotation position of the rotor 46 by counting magnetic pole shifts.

The drum 63 is housed and rotatably supported in the drum case 60. Specifically, the drum 63 is rotatably housed in the drum housing 61a of the drum housing case 61. The drum housing 61a has an almost cylindrical shape, and a minute gap "5" is formed between the radial interior of the drum housing 61a and the outer periphery of the drum 63.

Here, one side of the drum 63 in its axial direction is rotatably supported by the fourth columnar portion 48d of the rotor shaft 48, while the other side of the drum 63 in its axial direction is rotatably supported by a cover-side cylindrical portion 62a of the drum case cover 62. In this manner, the drum 63 is prevented from tilting when the driving unit 30 is operated. Therefore, by preventing the drum 63 from tilting, the gap between the radial interior of the drum housing 61a and the outer periphery of the drum 63 can be set to be a minute gap "S", and it is possible to reduce the size of the drum case 60 along the radial direction of the drum 63 (width dimension). In this manner, the drum 63 is set coaxial with the rotor shaft 48, as the electric motor 43 is.

A helical cable groove 63a is formed on the outer periphery of the drum 63, and the cables 23 and 24 are fitted in it. This cable groove 63a guides one end parts of the cables 23 and 24 when they are wound around the drum 63, so that the one end parts of the cables 23 and 24 are wound around the drum 63 several times along its cable groove 63a. In addition, the rotation of the drum 63 in the normal direction causes the opening cable 23 to be wound along the cable groove 63a, while the rotation of the drum 63 in the reverse direction causes the closing cable 24 to be wound along the cable groove 63a. In this manner, by rotating the drum 63 in the normal and reverse directions, parts of the cable 23 band 24 to come in and out of the casing 31.

A through-hole 63b extending and penetrating the drum 63 in its axial direction is formed on the inner periphery of the drum 63. A first bearing fixing portion 63c is formed on one side of the through-hole 63b in its axial direction, and has a diameter larger than that of the through-hole 63b. A second bearing fixing portion 63d is formed on the other side of the through-hole 63b in its axial direction, and has a diameter equal in size to that of the first bearing fixing portion 63c. The bearing fixing portions 63c and 63d have third and fourth ball bearings (bearings) 64a and 64b press fitted and fixed therein, respectively.

Here, the inner diameter of each of the ball bearings 64a and 64b is determined to be slightly smaller than the inner diameter of the through-hole 63b (which is not shown in detail). In this manner, with the fourth columnar portion 48d of the rotor shaft 48 put through the third ball bearing 64a to be fitted therein (arrangement shown in FIG. 4), the fourth columnar portion 48d is prevented from coming in contact with the through-hole 63b. Therefore, it is possible to allow the fourth columnar portion 48d and the drum 63 to smoothly rotate with respect to each other almost without resistance.

In addition, with the cover-side cylindrical portion 62a of the drum case cover 62 put through the fourth ball bearing 64b to be fitted therein (arrangement shown in FIG. 4), the cover-side cylindrical portion 62a is prevented from coming in contact with the through-hole 63b. Therefore, it is possible to allow the cover-side cylindrical portion 62a and the drum 63 to smoothly rotate with respect to each other almost without resistance.

In this embodiment, as shown in figures, the third and fourth ball bearings 64a and 64b are composed of ball bearings each having an inner race, an outer race, and balls, but they are not limited to the ball bearings, and may be replaced with, for example, so-called metal bearings (slide bearings) each having a cylindrical steel pipe having an inner surface provided with a fluororesin layer.

As shown in FIG. 3, on the left and right of the drum housing case 61, the drum housing 61a is disposed between the pair of tensioner housings 61b disposed as to face each other. The tensioner housings 61b are respectively provided so as to correspond to the opening cable 23 and the closing cable 24. Each tensioner housing 61b is formed into an almost rectangular shape, and the tensioner mechanism 70 is housed in it.

The tensioner mechanism 70 has a tensioner pulley 71 and a coil spring 72, the tensioner pulley 71 being wound with the cable 23 or 24. Since the coil spring 72 keeps pushing the tensioner pulley 71 in an arrowed direction "M" shown in FIG. 3, it can get rid of a slack (loose portion) of the cable 23 or 24 resulting from a long period of use of the cable. Therefore, it is possible to prevent the rattle and vibration of the sliding door 13 (see FIGS. 1 and 2) when it is driven.

As shown in FIG. 4, in the axial direction of the rotor shaft 48, a speed reduction mechanism 80 composed of a planetary gear mechanism is disposed between the electric motor 43 and the drum 63. This speed reduction mechanism 80 is disposed between the rotor shaft 48 and the drum 63, and capable of transmitting power between them, and constitutes a planetary gear speed reducer in the present invention. The speed reduction mechanism 80 has a sun gear 81, a ring gear 82, three planetary gears 83 (only one of which is shown in FIG. 4), and a carrier 84. Each of the gears 81, 82, and 83 is a spur gear. The reduction gear ratio of the speed reduction mechanism 80 is determined to be low, i.e., roughly equal to or lower than 30:1. In this manner, the speed reduction mechanism 80 is axially aligned with the rotor shaft 48, as the electric motor 43 is. The electric motor 43, the drum 63, and the speed reduction mechanism 80 are, therefore, set coaxial with each other along the rotor shaft 48 serving as their axis.

The sun gear 81 is fixed to the third columnar portion 48c of the rotor shaft 48, and therefore rotated together with the rotor shaft 48. The ring gear 82 is disposed around the sun gear 81 across a given gap, and fixed to the casing 31. Each of the planetary gears 83 is disposed between the sun gear 81 and the ring gear 82 along the radial direction of the speed reduction mechanism 80, and engaged with both the sun gear 81 and the ring gear 82 to rotate between them. In this manner, since the gears 81, 82, and 83 are arranged laterally, the driving unit 30 can be reduced in thickness, compared to a conventional speed reducer having a plurality of gears stacked up in the axial direction.

The carrier 84 rotatably supports three planetary gears 83 arranged at regular intervals (120-degree intervals), a radial interior of the carrier 84 is rotatably supported by the fourth columnar portion 48d of the rotor shaft 48 via a fifth ball bearing 85. Here, as shown in the figures, the fifth ball bearing 85 is composed of a ball bearing having an inner race, an outer race, and balls, but it may be replaced with, for example, a so-called metal bearing (slide bearing) constructed by coating the interior of a cylindrical steel pipe with a fluororesin layer.

The carrier 84 is connected to a projecting pin 63e integrally formed with the drum 63. Therefore, the drum 63 rotates together with the carrier 84, and the rotating speed of the sun gear 81 is reduced to a given rotating speed and enhanced in torque, so that the rotation force enhanced in torque is transmitted through the carrier 84 to the drum 63.

Here, only the speed reduction mechanism 80 is disposed between the electric motor 43 and the drum 63, that is, this means that an electromagnetic clutch and the like capable of cutting off power transmission is not disposed between the electric motor 43 and the drum 63. Therefore, this configuration realizes a reduction in size and weight of the driving unit 30, and allows simplification of control logic for the driving unit 30.

The electric motor 43, the drum 63, and the speed reduction mechanism 80 are set coaxial with each other along the rotor shaft 48 serving as their axis, and the electric motor 43 works as a three-phase brushless motor. As a result, when the sliding door 13 is opened and closed manually, the electric motor 43 is rotated at higher speed by the speed reduction mechanism 80, and the electric motor 43 can be rotated with a relatively small force. The siding door 13, therefore, can be opened and closed smoothly through a manual operation.

In addition, just when the sliding door 13 manually reached its fully-opened position or fully-closed position, an inertial force acts on the electric motor 43. For this reason, the electric motor 43 should originally have a structure strong enough to withstand a large inertial force. However, according to this embodiment, since the electric motor 43 is composed of an inner rotor type three-phase brushless motor, it has a smaller inertial mass (rotor mass). As a result, the inertial force acting on the electric motor 43 turns out to be not so large, and it is necessary to giving the electric motor 43 a sufficiently strong structure.

Furthermore, in the speed reduction mechanism 80 composed of the planetary gear mechanism, the sun gear 81 and planetary gears 83 (carrier 84) are components responsible for inertial force. This means that the ring gear 81, which is on the outermost part of the speed reduction mechanism 80 and its heaviest component, does not constitute an inertia mass. The speed reduction mechanism 80, therefore, has a small inertia mass, and the "shakiness" of the speed reduction mechanism 80 caused by the rotation of the ring gear 82 is suppressed. As a result, impact caused by abrupt stop of the speed reduction mechanism 80 is reduced, and vibrations and noises are suppressed effectively.

As shown in FIGS. 5 and 6, on the outer periphery of the ring gear 82 forming part of the speed reduction mechanism 80, the ring gear 82 is integrally formed with three engaging projections 82a which project from the ring gear 82 in a radially outward direction, and which are arranged at almost regular intervals (120-degree intervals) along the circumference of the ring gear 82.

As shown in FIGS. 4 and 5, the ring gear 82 is fixed to the motor housing case 42, and closer to the drum housing case 61. Specifically, the ring gear 82 is fixed to a ring gear attachment portion 42c formed integrally on the periphery of the disc-shaped body 42b of the motor housing case 42.

The ring gear attachment portion 42c has: an annular wall 42d which prevents the ring gear 82 from moving in its radial direction (from shifting away from the axis "C"); and three engaging recesses 42e (only two of which are shown in FIG. 5) into which the engaging projections 82a of the ring gear 82 are fitted respectively to be engaged with the engaging recesses 42e. In this manner, by engaging the engaging projections 82a with the engaging recesses 42e, the ring gear 82 is prevented from racing in the circumferential direction.

In addition, as shown in FIG. 6, a ring gear support 61c is formed integrally with the drum housing case 61, closer to the motor housing case 42, and axially supports the ring gear 82 attached to the ring gear attachment portion 42c. The ring gear support 61c has an annular shape, and projects toward the motor housing case 42. When the driving unit 30 is in its assembled state (see FIG. 4), the ring gear support 61c is fitted in the annular wall 42d of the ring gear attachment portion 42c, and brought into contact with the ring gear 82.

In this manner, by axially supporting the ring gear 82 by the ring gear support 61c, the ring gear 82 is prevented from moving in the axial direction. Specifically, the ring gear 82 is fixed to the casing 31 without being moved or rotated in the radial, axial and circumferential directions of the ring gear 82. Here, the ring gear support 61c constitutes a contact portion in the present invention.

The ring gear 82 is fixed to the motor housing case 42, and the rotor shaft 48 is rotatably supported by the motor housing case 42 via the ball bearings 49a and 49b. In this manner, the ring gear 82 and the rotor shaft 48 are fixed to and supported by the motor housing case 42, respectively. As a result, a coaxial state between the sun gear 81 fixed to the third columnar portion 48c of the rotor shaft 48 and the ring gear 82 is maintained with high precision. This feature also contributes to an effective suppression of the vibrations and noises of the speed reduction mechanism 80.

As shown in FIGS. 4 and 6, the drum housing case 61 is integrally formed with a disc-shaped intervening member 61d which is interposed between the drum 63 and the carrier 84 of the speed reduction mechanism 80. The intervening member 61d projects radially inward as compared with the drum housing 61a, and has a shape reduced in wall thickness. By causing the intervening member 61d to intervene between the drum 63 and the carrier 84 in this manner, a labyrinthically curved path "G" is formed between the drum case 60 and the motor case 40.

this manner, the curved path "G" prevents rainwater, dust, etc. entered the drum case 60 via the cables 23 and 24 from reaching the engaged parts of the gears 81, 82, and 83 of the speed reduction mechanism 80, the electric motor 43, the sensor board 50, etc. thereby enabling extension of the service life of the driving unit 30 and improvement in the maintenance of the driving unit 30.

As shown in FIG. 7, the drum housing case 61 is integrally formed with bush fitting potions 61e. Four bush fitting potions 61e are provided to the periphery of the drum housing case 61 (see FIG. 3). Each bush fitting portion 61e has almost C-shaped structure as shown in FIG. 9. The bush fitting portion 61e has a front side opening, a fitting bush 90 shown in FIG. 8 is fitted in this opening, and fixed (attached) to the bush fitting portion 61e.

As shown in FIG. 7, a hooking recess 61f is formed on the base end of the bush fitting portion 61e, and recessed in the thickness direction of the bush fitting portion 61e. With the fitting bush 90 fixed to the bush fitting portion 61e, a retainer claw 91e forming part of the fitting bush 90 is received in the hooking recess 61f.

As shown in FIG. 8, the fitting bush 90 is used to fix the driving unit 30 to the body panel 11a (see FIG. 2), and has a core metal 91 and a rubber damper 92. The core metal 91 is fixed to the body panel 11a (vehicle 10), while the rubber damper 92 is fixed to the drum housing case 61 of the driving unit 30.

Here, the core metal 91 constitutes a fixed-to-vehicle member in the present invention, and it is attached to the drum housing case 61 via the rubber damper 92. The rubber damper 92 constitutes a buffering member in the present invention, and it is disposed between the core metal 91 serving as the fixed-to-vehicle member and the drum housing case 61 serving as the casing.

As shown in FIG. 7, the core metal 91 has a small-diameter cylindrical portion 91a and a large-diameter cylindrical portion 91b larger in diameter than the small-diameter cylindrical portion 91a. The small-diameter cylindrical portion 91a and the large-diameter cylindrical portion 91b are formed integrally with each other, and have a first flange 91c and a second flange 91d formed integrally on their ends, respectively, such that both flanges are expended radially outward.

The second flange 91d is formed to be larger in diameter than the first flange 91c, and integrally formed with the flat plate-shaped retainer claw 91e turned back toward the large-diameter cylindrical portion 91b (turned upward in FIG. 7). The front end of the retainer claw 91e is received in the hooking recess 61f of the bush fitting portion 61e. As a result, for example, the fitting bush 90 is prevented from dropping off from the bush fitting portion 61e when the driving unit 30 is transported as a single unit.

Here, the first flange 91c is formed to be smaller in diameter than the second flange 91d so that the rubber damper 92 can be fitted easily from the same side as the first flange 91c as the rubber damper 92 is caused to deform elastically. This improves the assembling efficiency of the fitting bush 90.

The rubber damper 92 is made of natural rubber, and formed into an almost rectangular sectional shape. A through-hole 92a is formed inside the rubber damper 92. The first flange 91c is disposed on one side of the through-hole 92a in its axial direction (upper side in FIG. 7), while the second flange 91d is disposed on the other side of the through-hole 92a in its axial direction (lower side in FIG. 7). In addition, the first flange 91c is located inside the rubber damper 92 (see FIG. 8A), while the second flange 91d is located outside the rubber damper 92 (see FIG. 8B). Therefore, it is possible to check whether the assembled state of the core metal 91 and the rubber damper 92 (extent of insertion of the core metal 91 into the rubber damper 92) is appropriate.

The rubber damper 92 is formed integrally with an extended portion 92c having a slotted hole 92b and closer to the second flange 91d in the axial direction of the rubber damper 92. This extended portion 92c further extends outward in the radial direction of the core metal 91 in comparison with the first flange 91c formed along the axial direction of the rubber damper 92. The retainer claw 91e is inserted in the slotted hole 92b.

The approximate central part of the rubber damper 92 in its axial direction is formed as a fixing body 92d having an almost circular sectional shape. The fixing body 92d is inserted in the opening of the bush fitting portion 61e and fixed, and it has an axial dimension determined to be almost the same as the wall-thickness dimension of the bush fitting portion 61e. Therefore, the fitting bush 90 is fixed to the bush fitting portion 61e without being shaky.

According to the fitting bush 90 formed in the above manner, with the fitting bush 90 attached to the bush fitting portion 61e, the rubber damper 92a is disposed between the core metal 91 fixed to the body panel 11a and the rubber damper 92 fixed to the drum housing case 61 of the driving unit 30. Therefore, as indicated by a thick broken line arrow in FIG. 7, low frequency vibrations propagating from the ring gear 82 of the speed reduction mechanism 80 is transmitted via the ring gear support 61c of the drum housing case 61 and the bush fitting portion 61e to the rubber damper 92, and then absorbed by the rubber damper 92. In this manner, low frequency vibrations from the ring gear 82 are not transmitted to the core metal 91, that is, the body panel 11a (vehicle 10).

On the other hand, various vibrations propagating from the body panel 11a via the propagation path reverse to the above propagation path are also absorbed by the rubber damper 92. Therefore, it is possible to prevent the propagation of various vibrations from the body panel 11a to the driving unit 30. This extends the service life of the driving unit 30.

As shown in FIG. 7, a grounding terminal ET for grounding an electronic component (not shown) disposed around the electric motor 43 (see FIG. 4) is electrically connected to the large-diameter cylindrical portion 91b of the core metal 91. A steel insert pin (not shown) formed on the body panel 11a is inserted and fitted in the small-diameter cylindrical portion 91a of the core metal 91.

Therefore, as shown in FIG. 7, motor noise generated by the electric motor 43, etc., is caused to escape to the body panel 11a, that is, it is absorbed by a body grounding structure. As a result, this eliminates a detection error of the rotation sensor 51 (see FIG. 4), thereby allowing the driving unit 30 to operate with high precision.

In addition, with the driving unit 30 fixed to the body panel 11a using only the insert pin, the driving unit 30 may drop off from the body panel 11a due to traveling-caused vibrations, etc. For this reason, of the four fitting bushes 90 (see FIG. 3), three fitting bushes are fixed to the body panel 11a using such fixing means as bolts and nuts (not shown).

The fitting bush 90 formed in the above manner is attached to the bush fitting portion 61e by a fitting procedure shown in FIG. 9.

Firstly, as indicated by a broken line arrow (1) in FIG. 9, the first flange 91c of the core metal 91 faces the extended portion 92c of the rubber damper 92, and the first flange 91c and the extended portion 92c are then moved closer to each other. At this time, the slotted hole 92b of the rubber damper 92 and the retainer claw 91e of the core metal 91 are matched to each other. The core metal 91 is then inserted in the through-hole 92a of the rubber damper 92. Here, since the diameter of the first flange 91c is small, the core metal 91 can be inserted easily by causing the rubber damper 92 to slightly deform elastically. Subsequently, the retainer claw 91e is inserted in the slotted hole 92b to bring the second flange 91d of the core metal 91 into contact with the rubber damper 92. In this manner, the fitting bush 90 is assembled into its complete form.

Following this, as indicated by a broken line arrow (2) in FIG. 9, the retainer claw 91e of the completed fitting bush 90 faces the opening of the bush fitting portion 61e, and the fixing body 92d (see FIG. 8) is pushed into the opening to fit the fitting bush 90 into the bush fitting portion 61e. At this time, the fitting bush 90 is tilted slightly against the bush fitting portion 61e as the rubber damper 92 is caused to deform elastically. As a result, the front end of the retainer claw 91e is received in the hooking recess 61f (see FIG. 7) of the bush fitting portion 61e. In this manner, the fitting bush 90 has is completely fitted into the bush fitting portion 61e.

As described above, according to the driving unit 30 of the first embodiment, the ring gear 82 of the speed reduction mechanism 80 is fixed to the casing 31, and the casing 31 is provided with the core metal 91 fixed to the body panel 11a via the rubber damper 92. Therefore, the driving unit 30 can be reduced in size through adoption of the speed reduction mechanism 80 made up of the gears 81, 82, and 83 each composed of a spur gear, and the rubber damper 92 can suppresses low frequency vibrations which propagate from the speed reduction mechanism 80 to the body panel 11a.

Therefore, it is possible to prevent the resonance of the body panel 11a of the vehicle 10 at a low characteristic frequency thereof. As a result, it is possible to certainly prevent noises caused by the resonance of the vehicle panel 11a from being propagated to the vehicle interior (not shown) and giving an occupant an unpleasant feeling.

Next, the second embodiment of the present invention will be described in detail with reference to the drawings. In addition, elements and portions the same in configuration and function as those of the first embodiment are denoted by the same reference numbers as those of the first embodiment, and the detail explanations thereof are omitted.

Figure 10:
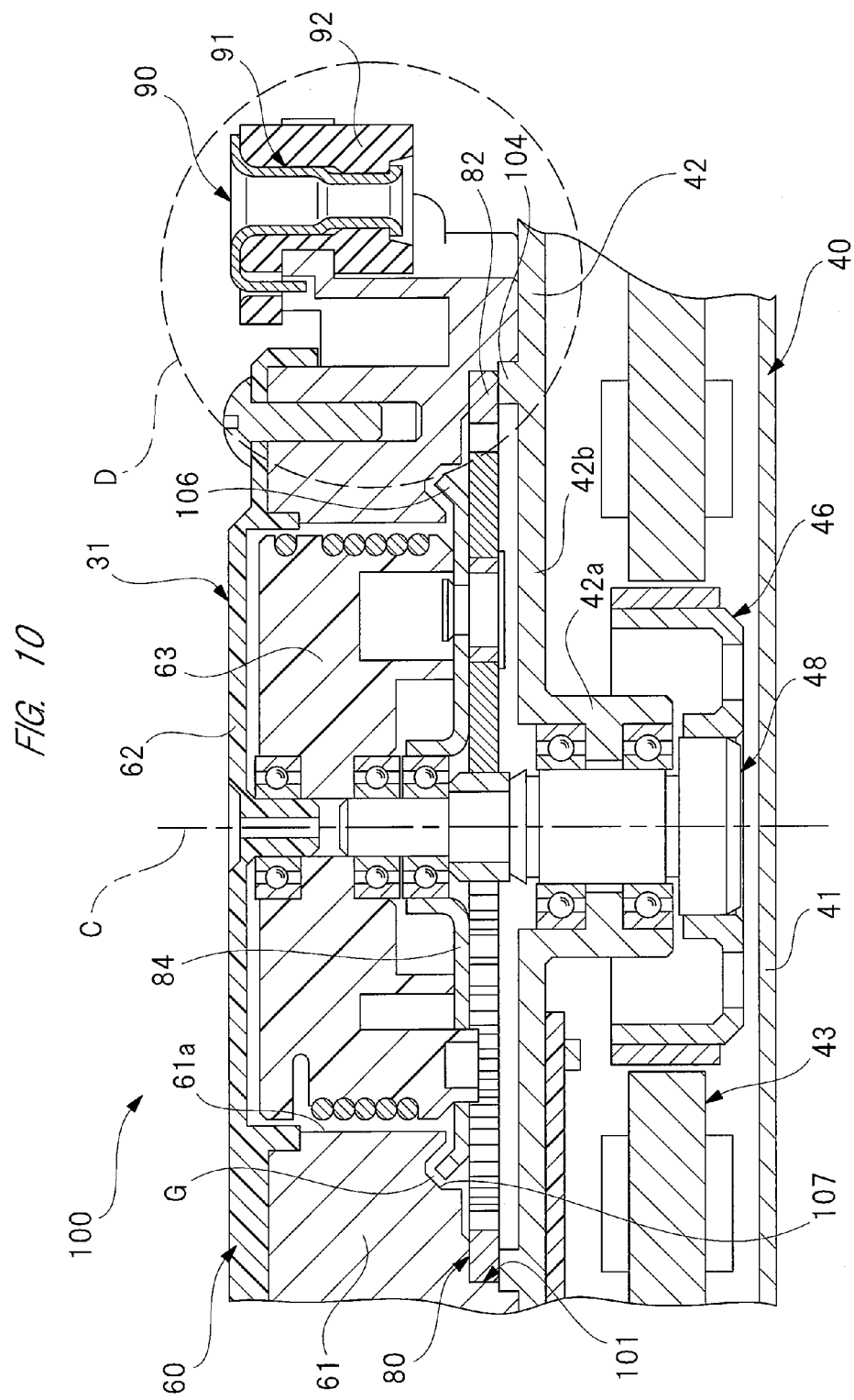
FIG. 10 is a partial sectional view showing a driving unit according to a second embodiment, and corresponding to the partial sectional view of FIG. 4.
Figure 11:
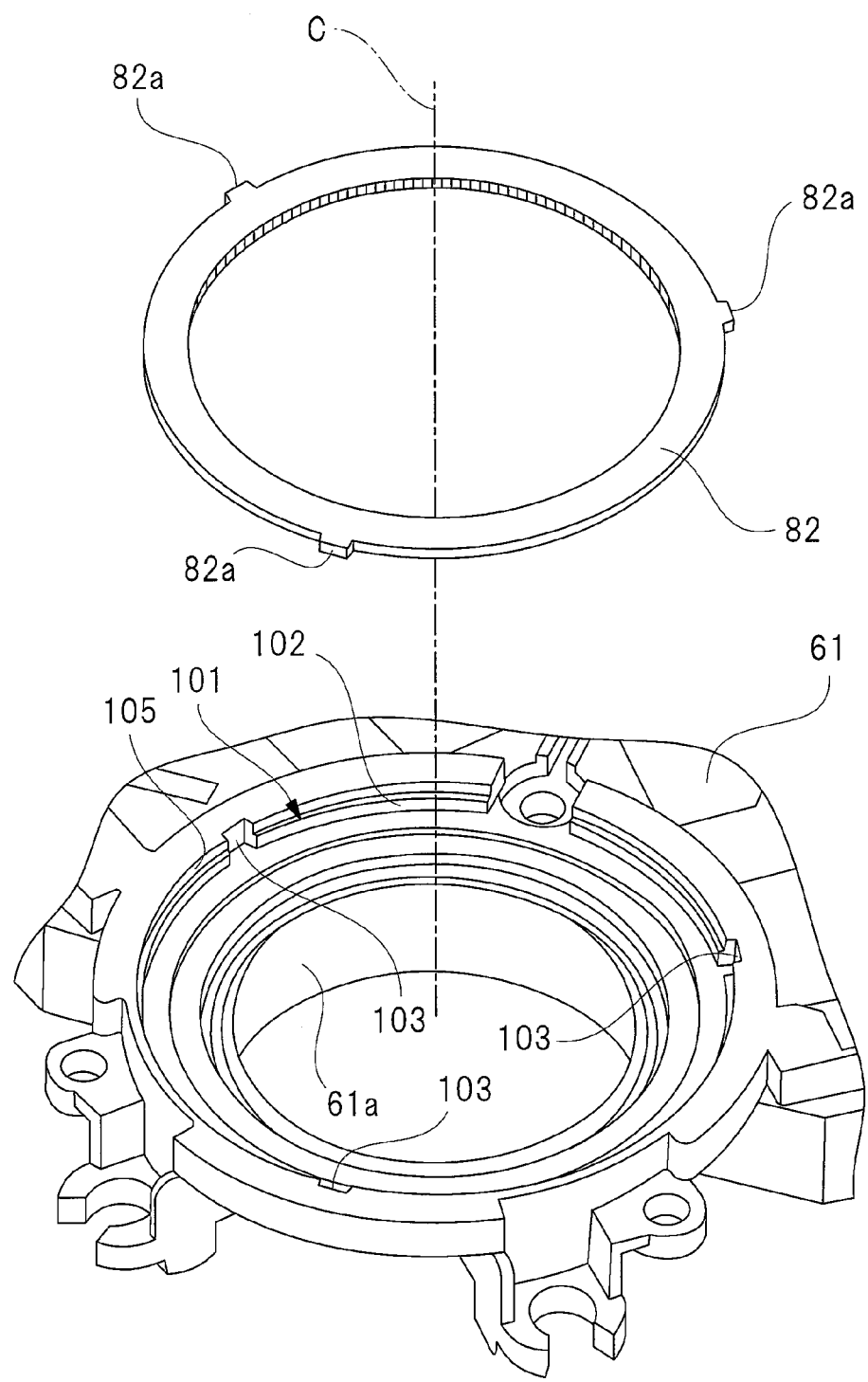
FIG. 11 is an exploded perspective view for explaining a fixing structure of the ring gear which is fixed to the drum housing case.
Figure 12:
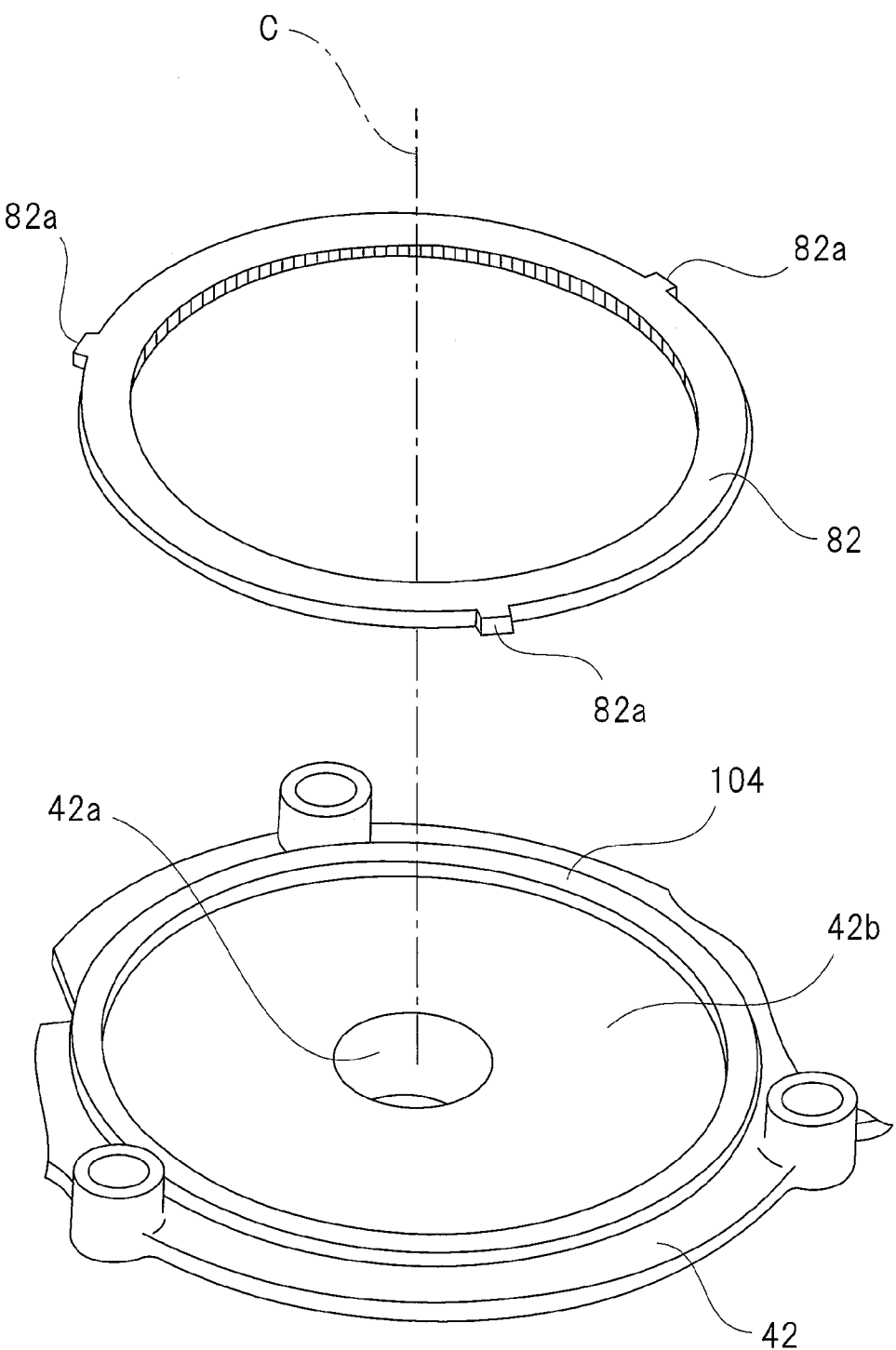
FIG. 12 is an exploded perspective view for explaining a support structure of a motor case cover which supports the ring gear.
Figure 13:
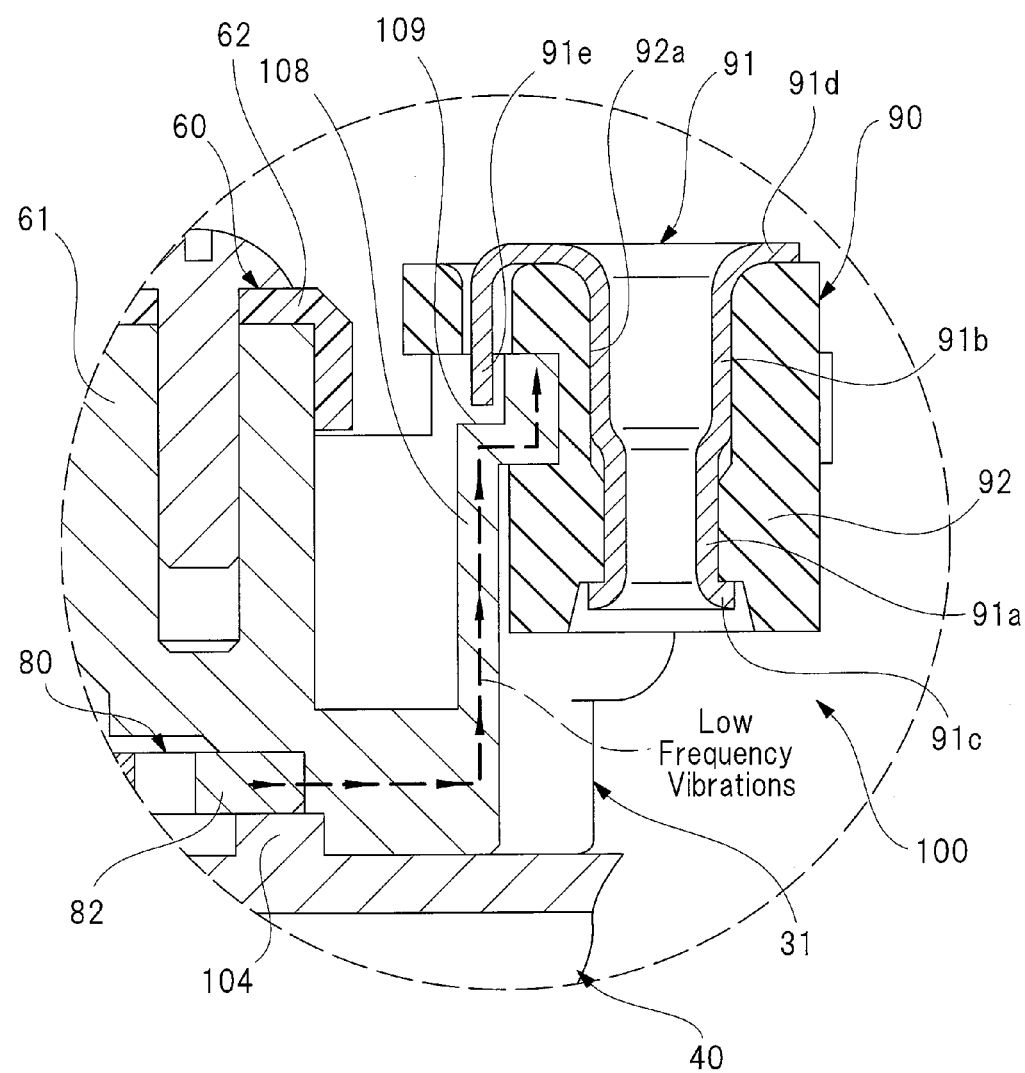
FIG. 13 is an enlarged sectional view showing a part enclosed in a broken line circle "D" in FIG. 10.

FIG. 10 is a partial sectional view showing a driving unit according to a second embodiment, and corresponding to the partial sectional view of FIG. 4, FIG. 11 is an exploded perspective view for explaining a fixing structure of the ring gear which is fixed to the drum housing case, FIG. 12 is an exploded perspective view for explaining a support structure of a motor case cover which supports the ring gear, and FIG. 13 is an enlarged sectional view showing a part enclosed in a broken line circle "D" in FIG. 10.

As shown in FIGS. 10 and 13, a driving unit 100 according to the second embodiment is different from the driving unit 30 according to the first embodiment in three respects: the fixing structure of the ring gear 82, the shape of the labyrinthically curved path "G", and the fitting direction of the fitting bush 90. These different respects will hereinafter be described in order.

As shown in FIGS. 10 and 11, the ring gear 82 is fixed to the drum housing case 61, and closer to the motor housing case 42. Specifically, the ring gear 82 is fixed to a ring gear attachment portion 101 integrally formed with the drum housing case 61 at a portion formed radially outside the drum housing 61a of the drum housing case 61 and closer to the motor housing case 42. In this manner, according to the second embodiment, the ring gear 82 is fixed to the drum housing case 61 serving as the second casing.

The ring gear attachment portion 101 has: an annular wall 102 which prevents the ring gear 82 from moving in the radial direction (from shifting away from the axis C); and three engaging recesses 103 into which the engaging projections 82a of the ring gear 82 are respectively fitted, they being engaged with the engaging recesses 103. In this manner, by engaging the engaging projections 82a with the engaging recesses 103, respectively, it is possible to prevent the ring gear 82 from racing in its circumferential direction.

In addition, as shown in FIG. 12, the motor housing case 42 is integrally formed with a ring gear support 104 which is closer to the drum housing case 61, and which supports the ring gear 82 attached to the ring gear attachment portion 101 to prevent the ring gear 82 from dropping off. The ring gear support 104 has an annular shape, and projects toward the drum housing case 61. When the driving unit 100 is in its assembled state (see FIG. 10), the ring gear support 104 is fitted in an annular fitting-in portion 105 (see FIG. 11) formed to be larger in diameter than the annular wall 102.

As shown in FIG. 10, a bent intervening portion 106 bent slantly toward the drum 63 is integrally formed on the outer periphery of the carrier 84. This bent intervening portion 106 intervenes in an annular groove 107 which is formed in the vicinity the drum housing 61a of the drum housing case 61, and slanted so as to open toward the motor housing case 42.

In this manner, by causing the bent intervening portion 106 to intervene in the annular groove 107, the labyrinthically curved path "G" is formed between the drum case 60 and the motor case 40. Therefore, as well as the first embodiment, the driving unit 100 can be improved in the service life and maintenance.

As shown in FIG. 13, the drum housing case 61 is integrally with a bush fitting portion 108. A hooking recess 109 is formed on the base end side of the bush fitting portion 108, and recessed in the thickness direction of the bush fitting portion 108. The hooking recess 109 is recessed toward the motor case 40 in contrast to the first embodiment. That is, the fitting direction of the fitting bush 90 is reverses to that of the first embodiment, and in this case, the retainer claw 91e of the fitting bush 90 is inserted in the hooking recess 109 from the same side as the drum case cover 62 (upper side in FIG. 13).

In addition, FIG. 13 shows a portion without a grounding terminal ET the same as that of FIG. 7 (first embodiment), that is, the fitting bush 90 which is fixed to the body panel 11a (see FIG. 2) with fixing means such as bolt and nut (not shown).

Also, the same effects as those of the first embodiment can be attained in the driving unit 100 constructed as described above.

The present invention is not limited to the above embodiments and obviously capable of numerous rearrangements, modifications and substitution of parts and elements without departing from the spirit and scope of the present invention. In the above embodiments, for example, a three-phase brushless motor is adopted as the electric motor 43, but it is not limited to the three-phase brushless motor. According to the present invention, a driving source other than the three-phase brushless motor, such as five-phase brushless motor and electric motor with brush may be adopted as the electric motor 43.

Furthermore, in the above embodiments, the sliding door 13 incorporated in the vehicle 10 is described as the opening and closing unit, but it is not limited to the sliding door. According to the present invention, the driving unit may be applied to an opening and closing unit other than the sliding door 13, such as a sunroof incorporated in the vehicle.

Furthermore, in the above embodiments, the buffering member made of natural rubber is adopted as the rubber damper 92, but it is not limited to natural rubber. According to the present invention, the buffering member made of industrial material as polyvinyl chloride or elastomer may be adopted as the rubber damper 92.

The driving unit is incorporated in a side part of a vehicle body of a vehicle, and used to drive a sliding door for opening and closing an opening formed on the side part of the vehicle.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A driving unit for opening and closing an opening and closing unit incorporated in a vehicle, comprising:
    a casing in which a rotating shaft is rotatably supported and housed;
    a planetary gear speed reducer having a ring gear fixed to the casing; and
    at least one fitting bush having: a fixed member attached to the casing and fixed to the vehicle, and a buffering member disposed between the casing and the fixed member,
    wherein the buffering member is formed with a through hole in which the fixing member is received,
    the fixed member has: a first flange which is disposed on one end side in an axial direction of the through hole, and a second flange which is disposed on the other end side in the axial direction of the through hole, thereby preventing the fixed member from dropping off from the through hole of the buffering member,
    the second flange of the fixed member is integrally formed with a retainer claw extending from the second flange in a direction of the first flange,
    the casing is integrally formed with: a fitting portion to which the fitting bush is fixed; and a hooking recess in which the retainer claw is received with the fitting bush fixed to the fitting portion, with the retainer claw received in the hooking recess of the case, the retainer claw prevents the fitting bush from dropping off from the fitting portion of the casing.

2. The driving unit according to claim 1, wherein the casing has: a first casing in which an electric motor for rotating the rotating shaft is housed; and a second casing to which the fixed member is attached, the ring gear is fixed to the first casing, and the second casing has a contact portion which is in contact with the ring gear.

3. The driving unit according to claim 1, wherein the casing has: a first casing in which an electric motor for rotating the rotating shaft is housed; and a second casing to which the fixed member is attached, the ring gear is fixed to the second casing.

4. The driving unit according to claim 1, wherein the hooking recess in which the retainer claw is inserted is composed of a slotted hole.

* * * * *